United States Patent
Miller

(10) Patent No.: US 10,444,322 B2
(45) Date of Patent: Oct. 15, 2019

(54) SYSTEMS AND METHODS FOR COHERENCE BASED POSITIONING

(71) Applicant: SWFL, Inc., Reno, NV (US)

(72) Inventor: Jeremie Miller, Reno, NV (US)

(73) Assignee: SWFL, Inc., Reno, NV (US)

(*) Notice: Subject to any disclaimer, the term of this patent is extended or adjusted under 35 U.S.C. 154(b) by 0 days.

(21) Appl. No.: 16/055,403

(22) Filed: Aug. 6, 2018

(65) Prior Publication Data

US 2019/0049551 A1    Feb. 14, 2019

Related U.S. Application Data

(60) Provisional application No. 62/543,263, filed on Aug. 9, 2017.

(51) Int. Cl.
| | |
|---|---|
| *H04W 64/00* | (2009.01) |
| *G01S 5/10* | (2006.01) |
| *G06N 20/00* | (2019.01) |
| *G01S 5/02* | (2010.01) |

(52) U.S. Cl.
CPC .............. *G01S 5/10* (2013.01); *G01S 5/0215* (2013.01); *G01S 5/0242* (2013.01); *G01S 5/0278* (2013.01); *G01S 5/0289* (2013.01); *G06N 20/00* (2019.01); *H04W 64/003* (2013.01)

(58) Field of Classification Search
None
See application file for complete search history.

(56) References Cited

U.S. PATENT DOCUMENTS

| | | | |
|---|---|---|---|
| 7,046,964 B1 | 5/2006 | Sullivan et al. | |
| 9,213,083 B1* | 12/2015 | Carter | ........................ G01S 5/10 |
| 9,702,965 B2* | 7/2017 | Horvat | ................... G01S 5/0294 |
| 2001/0004601 A1* | 6/2001 | Drane | ..................... G01S 1/024 |
| | | | 455/456.1 |
| 2002/0193941 A1* | 12/2002 | Jaeckle | ..................... G01S 5/10 |
| | | | 455/456.6 |
| 2003/0016170 A1 | 1/2003 | Jandrell | |

(Continued)

OTHER PUBLICATIONS

International Search Report and the Written Opinion of the International Searching Authority, Application No. PCT/US18/045331, dated Oct. 16, 2018.

*Primary Examiner* — German Viana Di Prisco
(74) *Attorney, Agent, or Firm* — Jeffrey Schox; Padowithz Alce

(57) ABSTRACT

Systems and methods for discovering a device having an unknown location includes: a first signal source having a first known location and a second signal source having a second known location, the first signal source and the second signal source transmit radio signals using a first radio frequency band during a first search cycle; a sampling receiver having a known location that samples radio signals transmitted by the first signal source and the second signal source during the first search cycle; a disoriented sampling receiver having an unknown location that samples radio signals transmitted by the first signal source and the second signal source during the first search cycle; and a signal processor: aggregates the samples of the radio signals from the sampling receiver and the disoriented sampling receiver; analyzes the aggregated samples of the radio signals; and determines a first set of possible locations of the disoriented sampling receiver.

15 Claims, 4 Drawing Sheets

(56) References Cited

U.S. PATENT DOCUMENTS

| | | |
|---|---|---|
| 2003/0203743 A1 | 10/2003 | Sugar et al. |
| 2010/0039326 A1 | 2/2010 | Lefever et al. |
| 2010/0271263 A1* | 10/2010 | Moshfeghi ............ G01S 5/0263 342/378 |
| 2011/0117932 A1* | 5/2011 | Breitbach ............. G01S 5/0205 455/456.1 |
| 2012/0032855 A1* | 2/2012 | Reede ................... G01S 5/0289 342/458 |
| 2012/0050103 A1 | 3/2012 | Revol |
| 2012/0182180 A1* | 7/2012 | Wolf ....................... G01S 5/021 342/357.29 |
| 2012/0256783 A1 | 10/2012 | Sego et al. |
| 2013/0162480 A1* | 6/2013 | Gander ................ G01S 5/0215 342/387 |
| 2014/0295878 A1* | 10/2014 | Yang .................... G01S 5/0252 455/456.1 |
| 2016/0127058 A1 | 5/2016 | Souvik et al. |
| 2017/0030996 A1 | 2/2017 | Fireaizen et al. |
| 2017/0074980 A1 | 3/2017 | Adib et al. |
| 2018/0235025 A1* | 8/2018 | Chen ....................... H04L 5/001 |

\* cited by examiner

300

Generating Signal Interference S310

Sampling Signal Strength S320

Switching Sampling Mode S325

Analyzing Signal Samples S330

Measuring Sub-Carrier Signal S335

Reducing Location Possibilities S340

Identifying a Location of the Object S350

SYSTEMS AND METHODS FOR COHERENCE BASED POSITIONING

CROSS-REFERENCE TO RELATED APPLICATIONS

This application claims the benefit of U.S. Provisional Application No. 62/543,263, filed 9 Aug. 2017, which is incorporated in its entirety by this reference.

TECHNICAL FIELD

The inventions of the present application relate generally to the field of radio frequency location, and more specifically to improved systems and radio location techniques for locating devices and/or objects.

BACKGROUND

In radio location, many radio frequency (RF) techniques may be used to determine locations of objects. Of these techniques, differential interferometry is a technique that is commonly used in many RF location applications. Several of the applications of differential interferometry are based on radar technology, in which signals (e.g., microwaves, etc.) are transmitted by a single transmitter that also functions as a receiver that listens for the signals that bounce back (a.k.a. "backscatter") to determine object locations. For instance, ultra-wide-band radar relies greatly on differential interferometry. The transmitter of the ultra-wide-band radar uses a large energy burst to generate a strong signal. The ultra-wide-band radar would then implement a wideband receiver to listen to the response and measure the exact time it takes the response to return to the radar device.

The traditional RF devices, like the ultra-wide-band radar, implementing differential interferometry can include very complex architectures, in that, they require expensive, bulky, and often high-power consuming components. Additionally, these traditional RF devices require high speed clocks to measure actual phase differentials with very precise timing. Consequently, these RF devices have very good crystal and highly sensitive signal processing circuitry or devices to process the measurements obtained by a receiver.

Moreover, because these traditional RF devices are complex in architecture and require significant energy resources to operate, they are not suitable for more constrained applications (e.g., in geographically remote locations, in locations where GPS or similar services are unavailable, such as indoors or underground, or among low-power devices that need to be autonomous in order to function properly).

Accordingly, there is a need in the radio location field for low-power and accurate techniques and systems for locating devices and/or objects and specifically, for locating devices and/or objects in constrained applications. The below-described embodiments of the present application provide such advanced radio location technique and systems.

SUMMARY OF THE INVENTION

In one embodiment, a system for discovering a device having an unknown location includes: a first signal source having a first known location and a second signal source having a second known location, the first signal source and the second signal source transmit radio signals using a first radio frequency band during a first search cycle; a sampling receiver having a known location that samples radio signals transmitted by the first signal source and the second signal source during the first search cycle; a disoriented sampling receiver having an unknown location that samples radio signals transmitted by the first signal source and the second signal source during the first search cycle; and a signal processing node that: aggregates the samples of the radio signals from the sampling receiver and the disoriented sampling receiver; analyzes the aggregated samples of the radio signals; and determines a first set of possible locations of the disoriented sampling receiver based on the analysis.

In one embodiment, reducing the set of possible locations of the disoriented sampling receiver by implementing a second search cycle that includes: generating, by the first signal source and the second signal source, radio signals using a second radio frequency band during the second search cycle, wherein the second radio frequency band is distinct from the first radio frequency band; collecting, by the sampling receiver and the disoriented receiver, samples of the radio signals in the second radio frequency band during the second search cycle, wherein the second search cycle is performed in a period distinct from a period of the first search cycle; processing, by the signal processing node, an aggregation of the samples of the radio signals from the sampling receiver and the disoriented sampling receiver collected during the second search cycle; analyzing the aggregated samples of the radio signals from the second search cycle; and determining a reduced set of possible locations of the disoriented sampling receiver based on the analysis, wherein the reduced set includes a set of possible locations of the disoriented sampling receiver in a smaller search area than the first set.

In one embodiment, in an additional search cycle: an operating mode of the first signal source or the second signal source is switched from a radio signal transmission mode to a radio signal receiving mode, an operating mode of the sampling receiver is switch from a radio signal receiving mode to a radio signal transmission mode, transmitting radio signals using a second radio frequency band, collecting samples of the radio signals in the second radio frequency band, determining an additional set of possible locations of the disoriented sampling receiver based on an analysis of the samples of the radio signals in the second radio frequency band during the additional search cycle.

In one embodiment, the sampling receiver and the disoriented sampling receiver are time synchronized enabling one or more start times of a collection phase of the samples of the radio signals and one or more end times of the collection phase by each of the sampling receiver and the disoriented receiver to occur at same times.

In one embodiment, the method includes implementing at least two radio signal sources having known locations; implementing at least one radio signal receiving device having a known location; establishing a communication network between the at least two radio signal sources, the at least one radio signal receiving device having the known location, and at least one radio signal receiving devices having an unknown location; initiating, by each of the at least two radio signal sources, a coordinated transmission of radio signals using a same radio frequency band for a first period; collecting, by the at least one radio signal receiving device having the known location and by the one or more radio signal receiving device having the unknown location, one or more samples of the radio signals transmitted by the at least two radio signal sources during the first period; analyzing the one or more samples of the radio signals collected by the at least one radio signal receiving devices having the known location and by the at least one radio signal receiving device having the unknown location, wherein the analyzing includes: identifying coherence points and incoherence points within the one or more samples of the radio signals; and identifying one or more possible locations of the at least one radio signal receiving device having the unknown location based on the identified coherence points and incoherence points within the one or more samples of the radio signals.

In one embodiment, the method includes setting radio signal transmission parameters for each of the at least two radio signal sources, wherein setting the radio signal transmission parameters includes: setting a same radio signal transmission start time for each of the at least two radio signal sources; setting a same radio signal transmission end time for each of the at least two radio signal sources; and setting the same radio frequency band for the radio signal transmission for each of the at least two radio signal sources.

In one embodiment, the method includes setting radio signal transmission parameters for each of the at least two radio signal sources, wherein setting the radio signal transmission parameters includes: setting each of the at least two radio signal sources to transmit the radio signals in a phase-locked manner.

In one embodiment, the method includes setting radio signal sampling parameters for the at least one radio signal receiving device having the known location and for the at least one radio signal receiving device having the unknown location, wherein setting the radio signal sampling parameters includes: setting a same radio signal sampling start time for the at least one radio signal receiving device having the known location and for the at least one radio signal receiving device having the unknown location; and setting a same radio signal sampling end time for each of the at least one radio signal receiving device having the known location and for the at least one radio signal receiving device having the unknown location.

In one embodiment, the method includes providing an initialization signal to each of: the at least two radio signal sources, the at least one radio signal receiving device having the known location, and the at least one radio signal receiving device having the unknown location, wherein the initialization signal coordinates the coordinated radio signal transmission and the collection of the one or more samples of the radio signals.

In one embodiment, the method includes reducing the possible locations of the at least one radio signal receiving device having the unknown location, wherein the reducing includes: setting the at least two radio signal sources to a second radio frequency band; transmitting, by each of the at least two radio signal sources, radio signals using the second radio frequency during a second period; collecting, by the at least one radio signal receiving device having the known location and by the at least one radio signal receiving device having the unknown location, samples of the radio signals using the second radio frequency band during the second period.

In one embodiment, the method includes implementing a trained machine learning model that predicts the second radio frequency band used in reducing the possible locations of the at least one radio signal receiver having the unknown location, wherein the implementing includes: providing machine learning input into the trained machine learning model, machine learning input comprising two or more of: superposition patterns of coherence signals identified from the one or more samples of the radio signals collected by the at least one radio signal receiving devices having the known location and by the at least one radio signal receiving device having the unknown location during the first period, the known locations of the two or more signal sources and the sampling receiver, and a phase angle between sub-carrier signals; and identifying, by the trained machine learning model, the second radio frequency band based on the machine learning input.

In one embodiment, the method includes varying positions of one or more peaks and troughs of a coherence signal generated by the at least two radio signal sources by selectively varying the radio frequency band used by the at least two radio signal sources during the first period or during a second period.

In one embodiment, the method includes switching an operating mode of one or more the at least two radio signal sources from a radio signal transmission mode to a radio signal receiving mode; and switching an operating mode of the at least one radio signal receiving device having the known location from a radio signal receiving mode to a radio signal transmission mode.

In one embodiment, the method includes causing the at least one radio signal receiving device in the radio signal transmission mode and one of the at least two radio signal sources to transmit coordinated radio signals during a second period; and causing the one or more of the at least two radio signal sources in the radio signal receiving mode to collect one or more samples of the radio signals during the second period.

In one embodiment, switching the operating mode of one or more the at least two radio signal sources and the operating mode of the at least one radio signal receiving device having the known location is based on an expiry the first period or based on an indication that a sufficient sampling size of the radio signals has been collected.

In one embodiment, the analyzing further includes: measuring a phase the one or more samples of radio signal data collected by the at least one radio device having the known location; measuring a phase the one or more samples of radio signal data collected by the at least one radio device having the unknown location; comparing, using time synchronization data, super positions patterns of identified coherent segments of the one or more samples of radio signal data collected by the at least one radio device having the known location and identified coherent segments of the one or more samples of radio signal data collected by the at least one radio device having the unknown location, wherein the identifying one or more possible locations of the at least one radio signal receiving device having the unknown location is further based on the comparison.

In one embodiment, reducing the possible locations of the at least one radio signal receiving device having the unknown location further includes: measuring a sub-carrier radio signal of an interference signal produced by the radio signals transmitted by the at least two radio signal sources; identifying a phase angle between coherence segments of the measured sub-carrier radio signal; and identifying a distance between the at least one radio signal receiving device having the known location and the at least one radio signal receiving device having the unknown location.

In one embodiment, the method includes generating a mapping of the identified one or more possible locations of the at least one radio signal receiving device having the unknown location; identifying clusters of possible locations based on the mapping; identifying a single approximate location of the at least one radio signal receiving device having the unknown location based on the clusters, the known locations of each of the at least two radio signal sources, and the known location of the radio signal receiving device having the known location.

DESCRIPTION OF THE PREFERRED EMBODIMENTS

The following description of preferred embodiments of the invention is not intended to limit the invention to these preferred embodiments, but rather to enable any person skilled in the art to make and use this invention.

Overview

The embodiments of the present application function to utilize intentionally generated interference between multiple signals transmitted by at least two transmitters with one or more sampling receivers having known locations and one or more unknown sampling receivers having unknown locations, in time coordination, to process the coherence and incoherence of the multiple signals as a reduction signal in the search space of possible positions of the unknown sampling receiver relative to the transmitters.

The transmitters of one or more embodiments of the present application may be configured for radio frequency signal generation with stable phase and/or frequency characteristics. The receivers of the one or more embodiments of the present application may be configured for received signal strength sampling with high sampling rates and precision. Both the transmitters and the receivers described in one or more embodiments of the present application may be very limited in nature; meaning that the transmitters and receivers may be, in many instances, constrained devices in one or more respects including, but not limited to, having limited processing capabilities, security capabilities, limited storage capacity/capabilities, limited battery or energy capacity, limited connectivity, and the like.

At least some of the embodiments of the present application enable the limited and/or constrained devices of the present application to perform high precision device location while preserving the energy and/or computing resources of the devices involved in the device searching process.

Accordingly, one or more technical benefits of the embodiments of the present application include the preservation of energy of a limited or constrained device while using an RF location technique that yields accurate location results for another device having an unknown location. The applications of the embodiments of the present application include, but should not be limited to, radio location of objects and/or devices when a high-energy consuming technique, such as a global positioning system (GPS) is not available or otherwise, is limited; radio location of objects underground; and radio location of objects within structures (e.g., buildings or homes, etc.).

1. System for Coherence Based Positioning

Figure 1:
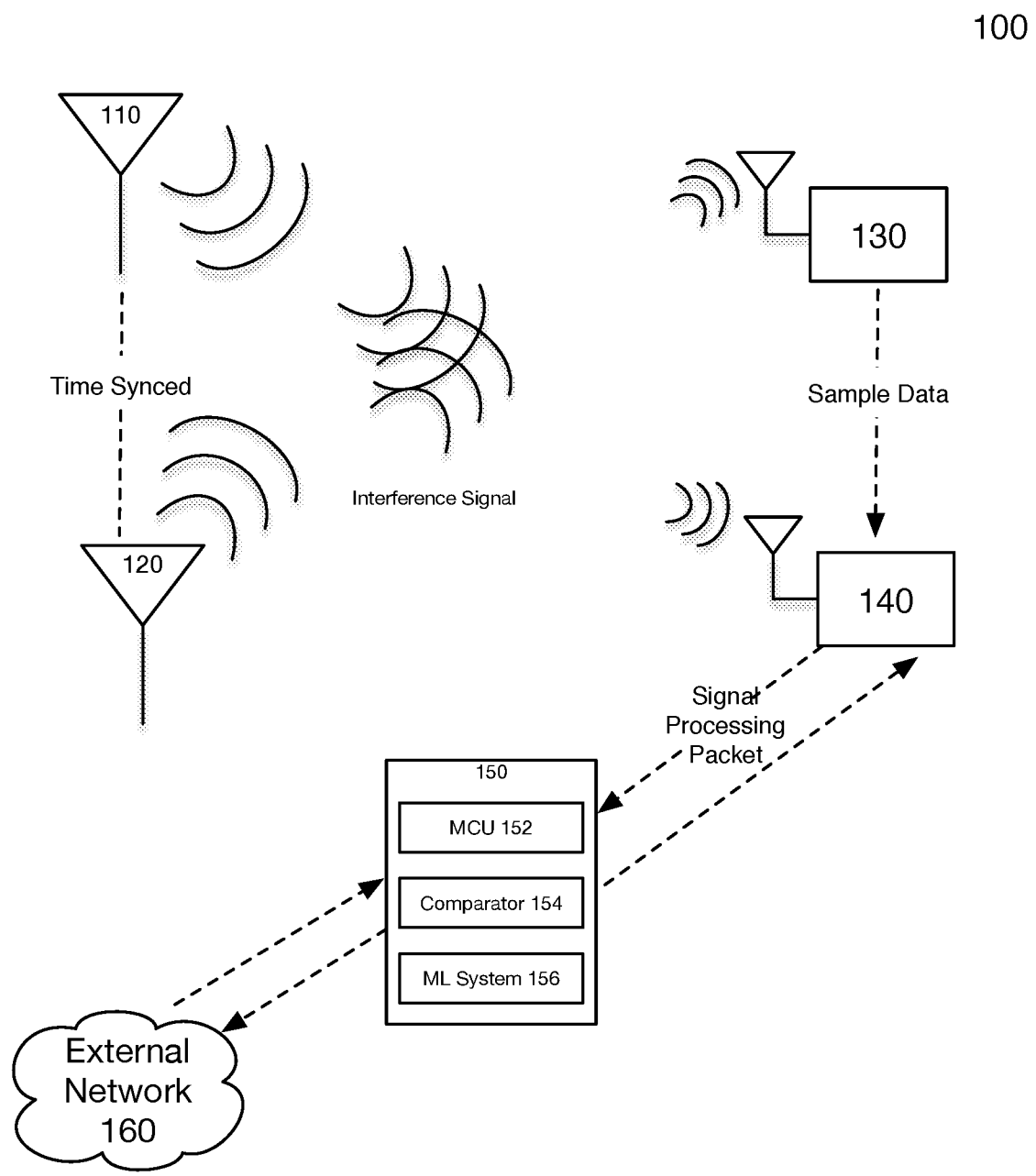
FIG. 1 illustrates a system 100 in accordance with one or more embodiments of the present application.

As shown in FIG. 1, a system 100 for determining a position of a disoriented device includes a first signal source 110, a second signal source 120, one or more signal receiving devices 130, one or more undetermined signal receiving devices 140, a signal processing node 150, and an external network 160.

The system 100 as illustrated in FIG. 1 is preferably configured to intentionally generate interference signals using the first signal source 110 and the second signal source 120. Specifically, the system 100 functions to determine coherence based on the interferences of the signals generated by the first and second signal sources 110, 120. The system 100, additionally, functions to use the one or more signal receiving devices 130 and the one or more undetermined (e.g., unknown location) signal receiving devices 140 to capture sample data of the signal strength of the signal interference generated by the signal sources. The system 100 may then use the signal processing node 150 to collect and process the sample data to reduce the possible locations of the one or more undetermined signal receiving devices 140.

The first signal source 110 and the second signal source 120 may include signal transmitters configured with transmitting devices and/or circuitry for generating signals and preferably, radio signals along a predetermined radio frequency bandwidth or the like. In some embodiments, the first and second signal sources may also include circuitry and/or devices for receiving transmission signals. For instance, as shown in system 100A of FIG. 1A, an operating mode of the first and/or the second signal source may be switched to convert the signal transmitting devices to signal receiving devices. Preferably the signals transmitted by each of the first and second signal sources 110, 120 include radio frequency signals that, in some embodiments, are used to communicate with devices within and outside a pre-established network.

The first signal source 110 and the second signal source 120 may comprise any type of device (e.g., a computing device, a sensor, an actuator, etc.) but preferably comprise an autonomous or semi-autonomous device that is capable of operating autonomously (self-governing) and performing transactions autonomously without a central governing authority.

The one or more signal receiving devices 130 and the one or more undetermined signal receiving devices may include signal receivers configured to capture signal transmissions and preferably, to capture samples of radio signals generated by the first signal source 110 and the second signal source 120. In some embodiments, the one or more signal receiving devices 130 may also include circuitry and/or devices for generating transmission signals. Like the first and second signal sources 110, 120, the one or more signal receiving devices 130 may be configured to switch modes of operation from a signal receiver to a signal transmitter, as demonstrated in FIG. 1A.

Additionally, the one or more signal receiving devices 130 may have known locations relative to the known locations of the first and second signal sources 110, 120.

In some embodiments, the signal processing node 150 may include a device having increased computing resources and computing powers relative to the various other devices and nodes implemented in the system 100. For instance, the signal processing node may include a microcomputer (e.g., MCU) or microcontroller 152, comparator circuitry 154, and a machine learning system 156. Additionally, or alternatively, the signal processing node 150 may be a (remote) computing server that is in operable communication with one or more of the nodes and devices of system 100.

It shall be noted that while the signal processing node 150 may generally be described as being a disparate node within a network of signal transmitting and signal receiving nodes, the capabilities and/or functionalities of the signal processing node 150 may be integrated with and/or performed by any suitable node within the network including, but not limited to, the first and the second signal sources 110, 120 or the one or more signal receiving devices 130.

The machine learning system 156 of the signal processing node 150 may function to generate predictions of one or more search parameters for reducing the search space of possible locations for a device or node having an unknown geographical location. The machine learning system 156 may implement a machine learning model or an ensemble of machine learning models that function to use as machine learning input any test cycle parameters, test cycle data (including analysis of test cycle data), and/or data associated any of the one or more nodes and/or devices of system 100 to predict one or more search parameters or reduce the search space of possible locations of any unknown devices by predicting one or more high probability possible locations of the unknown devices. The predicted search parameters may include one or more test cycle parameters including one or more transmission signal frequencies that may be used to alter the transmission signal.

The machine learning system 156 may employ any suitable machine learning including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in radio location using coherence signal data and/or other data relevant to the system 100.

Figure 1A:
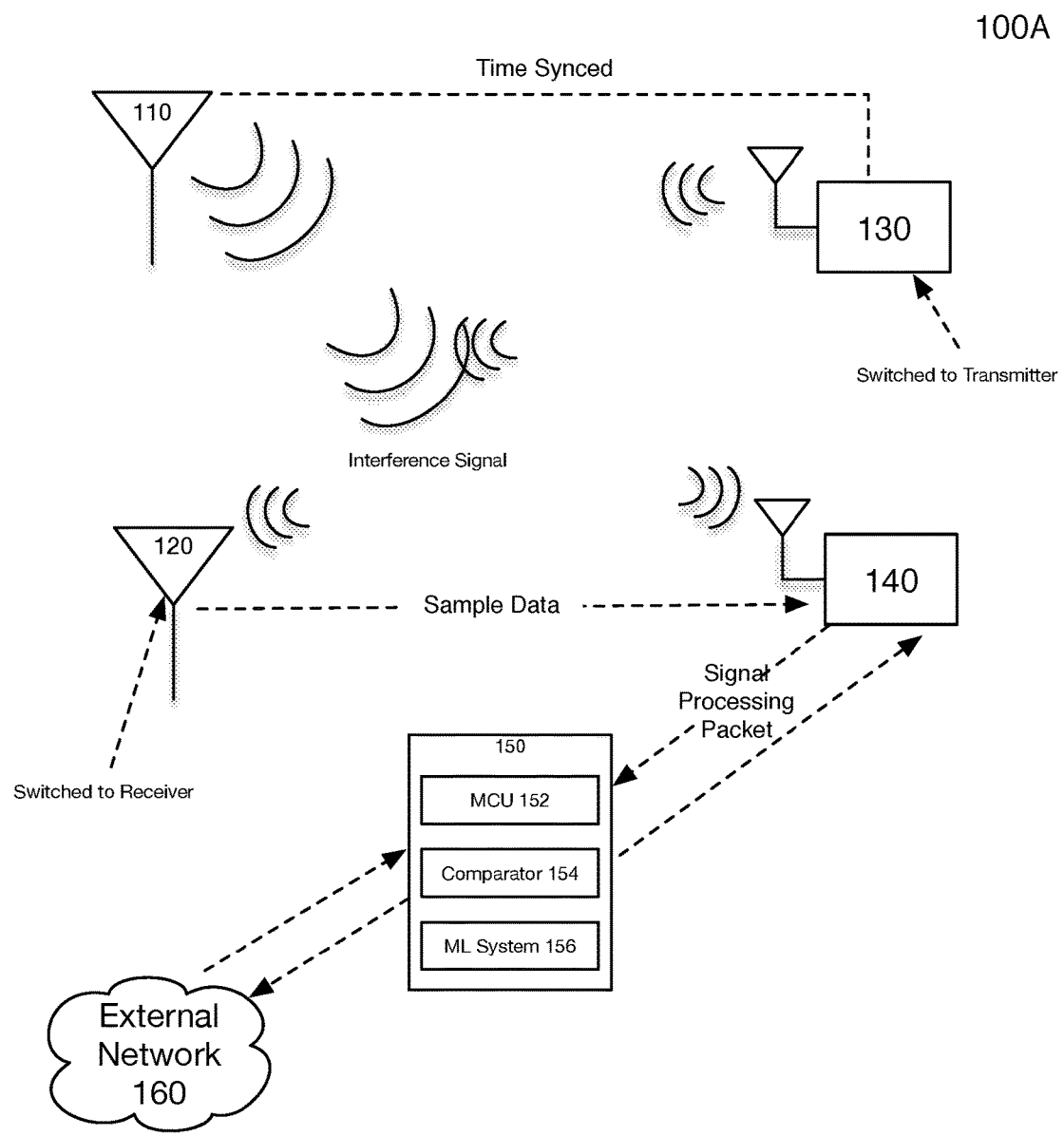
FIG. 1A illustrates another mode of the system 100 in accordance with one or more embodiments of the present application.

It shall be noted that while the signal processing node 150 may be illustrated in FIGS. 1-1A independently of the signal sources and the receivers, in some embodiments, the signal processing node 150 is combined with or resides within one or more of the signal sources and/or one or more of the receivers. For instance, the one or more signal receiving devices 130 may include each and every feature of the signal processing node 150 so that the capture signal sample data may be processed thereby.

Figure 2:
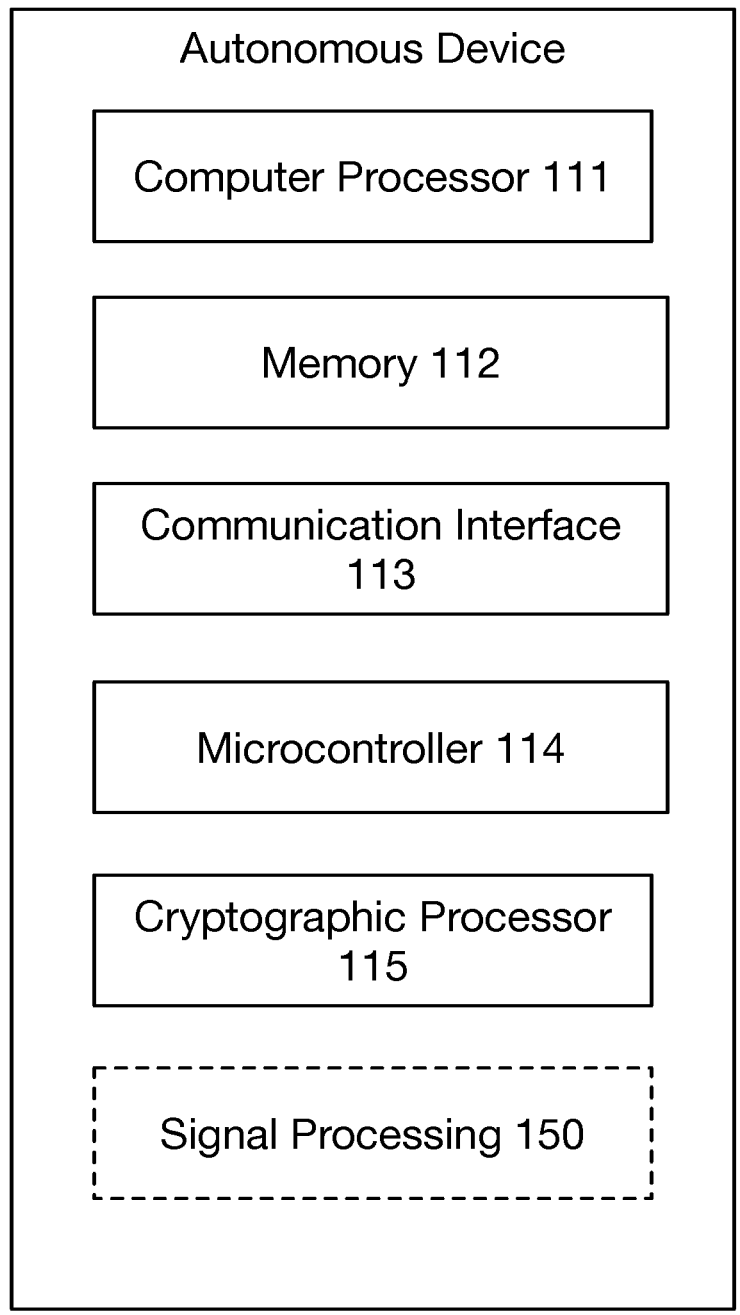
FIG. 2 illustrates a schematic of a radio location device of the system 100 in accordance with one or more embodiments of the present application.

Each of the first and second signal sources and the signal receivers 130, 140 may comprises any type of device including fully autonomous and/or semi-autonomous devices. In a preferred embodiment, each of the nodes and/or devices of system 100 comprise an autonomous device. As shown in FIG. 2, each autonomous device of system 100 comprises one or more computer processors 111 (or a main central processing unit 111), a memory 112 (static and dynamic memory), and a communication interface 113. In one variation, each autonomous device includes a microcontroller 114 having a small computer on a single integrated circuit containing a processor core, memory, and programmable input/output peripherals. The microcontroller 114, in some embodiments, is used in lieu of the one or more computer processors 111 and in other embodiments, the microcontroller is used in conjunction with the one or more computer processors 111. Additionally, and/or alternatively, the autonomous device includes a cryptographic coprocessor 115 which is a hardware security module or component which provides high security and high-throughput cryptographic subsystems and a crypto-accelerator chip 116, which may be integrated with the cryptographic coprocessor 115. The autonomous device may also include a modulator 117, an oscillator 118, a timer/clock 119, and a power supply 120.

The autonomous device of FIG. 2 may also include traditional elements of a device configured for radio communication at the communication interface 113. Thus, the communication interface 113 of autonomous device of a preferred embodiment includes a radio frequency (RF) scanner 121, RF transmitter 122, RF receiver 123, RF tuner 124, an antenna 125, and a RF amplifier 126.

The memory 112 of the autonomous device in a preferred embodiment includes one or more computer-executable instructions and/or software applications with computer code for executing the functionality and protocols of DIST including Telehash and TMesh (described U.S. patent application Ser. No. 15/345,414, which is incorporated herein by reference in its entirety) and any other functionality or protocols associated therewith, which are described herein required for secure and private communications by and between each of the nodes of the system 100.

The cryptographic coprocessor 115 of the autonomous device may be configured to implement various cryptographic processes including generating, managing, and storing cryptography keys and encrypting and decrypting cryptographically secured communications. Specifically, each autonomous device using the cryptographic coprocessor 115 is able to generate private/public cryptographic key pairs that can be used to cryptographically secure communication links and sessions between at least two nodes.

The autonomous device may be any type of device (e.g., semi- or fully autonomous), which may be coupled with one or more machines, instruments, components, and/or real world operational devices or elements to sense inputs and/or outputs thereof, to perform actuation operations of one or more components thereof, to perform transactions on behalf of the element or device to which the autonomous device is coupled, and the like. For example, in some embodiments, the autonomous device comprises a sensor that is able to obtain readings and other information relating to or about one or more devices to which the sensor is operably coupled and/or obtain readings about the environment surrounding the one or more devices and/or surrounding the autonomous device. Additionally, and/or alternatively, the autonomous device may be an actuator that performs and/or controls one or more actuation operations of a device to which the actuator is a component and/or is operably coupled to. In yet another example, the autonomous device may be a transaction device which brokers transactions on behalf of the device to which it is operably coupled and/or forms a component thereof. The transaction may include an exchange of value for a good, service, or other product offered to the autonomous device or the device to which the autonomous device is coupled. In such example, the autonomous device acting as a transaction device is able to negotiate with other devices and/or other autonomous devices to obtain resources for itself and the device to which it is coupled or provide resources from the device to which it is coupled for a negotiated value or the like from another device or party.

The external network 160 of system 100 is a network outside of the mesh network formed by the plurality of nodes including the transmitters and receivers of system 100. The external network 160 may be accessible to one or more of the plurality of nodes of the system 100 for the purposes of establishing an external communication channel outside of the mesh network to another entity, party, or device. It shall be noted that the external network is not necessary for the proper operation and implementation of secure communications and the like in the mesh network.

The external network 160 may be any type or kind of network that uses the Internet (e.g., GAN), WAN, LAN, or other centralized communication network to transmit and receive communications between parties.

2. Method for Coherence Based Positioning

Figure 3:
FIG. 3 illustrates a method 300 in accordance with one or more embodiments of the present application.

Referring to FIG. 3, a method 300 for determining a position of a device having an unknown location includes initiating a transmission of signals S310, collecting a sample of the transmission signals S320, analyzing the collected signal samples S330, using results of the analysis to reduce the search space of possible locations for the device having an unknown location S340, and determining a location of the device having the unknown location S350. Optionally, the method 300 includes switching the mode of one or more of the location discovery devices S325 and measuring a sub-carrier signal of the transmission signal S335.

The method 300 functions to enable the identification of a location of a remote device based on coherent interference of signal waves of two disparate and remote transmission devices. Specifically, the method 300 initiates a test cycle that functions to initialize a coherence between two wave sources (e.g., the two disparate and remote transmission devices) and contemporaneously, enable the reception functionalities of a receiving device having a known or predetermined location and of a second receiving device having an unknown location.

2.1.1 Test Cycle (Phase-I)—2-Dimensional Discovery

S310, which includes initiating a transmission of signals, functions to initiate a test cycle, using at least two transmitting devices having predetermined locations to form a coherence. The test cycle includes one or more predetermined testing parameters defining or governing a timing of the signal transmissions (e.g., start time/end time), a timing of sample collections, one or more phases of the signal transmissions, duration of the test cycle, one or more radio frequencies of the signal transmissions, and the like.

S310 may function to set the transmission parameters of the at least two transmitting devices according to the one or more predetermined testing parameters. Preferably, S310 functions to set each of the at least two transmitting devices to transmit in a phase-locked manner on a same frequency. Thus, a first phase of a signal produced by a first transmitting device and a second phase of a signal produced by a second transmitting device will be matched on a same frequency during the transmission of signals and preferably, throughout a duration of the test cycle. In this way, S310 functions to deliberately generate coherent interference using at least two transmission signals that may be continuously transmitted by the at least two transmitting devices.

Additionally, or alternatively, S310 may function to initiate receiving functionalities of a sampling receiver having a known or a predetermined geographic location and receiving functionalities of a disoriented receiver having an unknown geographic location. S310 may function to configure each of the at least two transmitting devices, the sampling receiver, and the disoriented receiver to be time synchronized such that each of the test cycle functionalities of each of these components may begin operating at a same time. For instance, at a time at which the at least two transmitting devices begin to transmit phase-locked signals on a same frequency, the sampling receiver and the disoriented receiver may also function to begin receiving or collecting samples of the coherence generated by the phase-locked signals.

In one variant of S310, S310 may function to time synchronize the transmission of signals by the at least two transmitting devices at a first time and separately, configure the sampling receiver and the disoriented receiver to begin collecting samples of the transmitted signals at a second time. For instance, the receivers may be configured to begin collecting sample data before (or after) the transmission of the signals by the transmitters is started (the opposite arrangement could also be achieved).

S310 may function to initiate the test cycle in any manner including by providing an initiating (or initialization) signal that may be simultaneously (or substantially simultaneously) received by each of the operable components and/or devices of the test cycle. That is, S310 may function to generate an initialization signal that may be provided to each of the signal sources and the signal receivers that enables a time coordinated effort in generating the radio signals and collecting the coherence of the radio signals, in parallel. In one implementation, the initialization signal may function to initialize or trigger an operation of the radio signal sources according to pre-set radio signal transmission parameters and trigger an operation of the radio signal receivers (signal sampling devices) according to pre-set radio signal sampling parameters.

In one variant, the initialization signal may include or may be augmented with initialization data for each of the transmitters and the receivers operating in a test cycle. For instance, the initialization data may include start times and end times for transmitting signals and receiving signals for each device in the test cycle, a radio frequency setting for each of the transmitting devices (e.g., signal sources), instructions for timestamp generation, and the like. In a preferred embodiment, the initialization data functions to coordinate the transmission of radio signals by the plurality of signal sources, such that the outgoing signals preferably begin at a same time, are on a same radio frequency, and/or their respective wave forms phase-locked throughout duration of the testing or device discovery cycle. In such preferred embodiment, the initialization data may additionally function to coordinate the collection and/or reception of the transmitted radio signals (or coherence), such that the radio signal receiver having the known location and the disoriented receiver may function to begin collecting and/or receiving the transmitted signals at the same time. Additionally, or alternatively, the initialization data may instruct the radio signal receiver and the disoriented receiver to generate a timestamp at the inception of radio signal collection, such that if the collection of the radio signals by the radio signal receiving device having a known location and the disoriented receiver are performed at different times, the radio signals collected by each receiving device may be matched or compared using the timestamp data to coordinate or correlate the radio signals for analysis.

Additionally, or alternatively, S310 may function to initiate the test cycle based on a signal transmitted to at least one node or device operating in the test cycle. The signal may include one or more test cycle parameters including coordination information, such as start times/end times for each component (if all the components are not already time synced). The node or device receiving the signal may function to transmit the signal directly to the known devices or components for the test cycle or otherwise, propagate the signal via a network (e.g., a mesh network) until the signal is received by all required devices or components for the test cycle. In such instance, the intended recipient devices or components may transmit a confirmation signal (or acknowledgement) indicating that the signal including the test cycle instructions are received.

S320, which includes collecting one or more samples of the transmission signals, functions to enable a sampling receiver and a disoriented receiver to collect one or more samples of the signal strength of the transmitted radio signals during the test cycle. Preferably, the sampling receiver and the disoriented receiver are time synchronized such that a start time of a collection phase and an end time of a collection phase of each of the sampling receiver and the disoriented receiver are the same. That is, S320 may function to time synchronize the sampling receiver and the disoriented receiver such that signal strength (radio signal) samples of the transmission signals by the at least two transmitting devices are a same size and include a same portion of the transmission signals.

Additionally, or alternatively, S320 may function to enable the sampling receiver and the disoriented receiver to collect multiple samples of the transmission signals (coherence signal) during a same test cycle in which the transmission of the signals by the at least two transmitters is uninterrupted and continue to be phase-locked and in the same frequency.

Additionally, or alternatively, S320 may function to enable the sampling receiver and the disoriented receiver to collect signal strength samples across varying test cycles in which the frequency of transmission used by the at least two transmitters may be selectively varied across one or more test cycles or within a same test cycle. That is, the at least two transmitting devices may function to transmit signals at a same frequency, however, the frequency of transmission used by both transmitters may vary at one or more predetermined times either within a same test cycle or along different test cycles.

In a preferred implementation, S320 functions to implement one or more additional test cycles to generate additional data that may further reduce the set of possible locations of the disoriented receiver identified in the initial test cycle. Preferably, S320 functions to implement a further search by selectively varying a frequency of signal transmission of the at least two transmitting devices while maintaining the phase-lock of the waves of the signals. In this way, the additional test cycle data generated according to S320 may be analyzed at S330 and further, used at S340 to reduce the possible locations of the disoriented receiver.

Specifically, S320 functions to select one or more frequencies for additional test cycles based on identifying the one or more frequencies with the highest probabilities for locating the disoriented receiver and/or the highest probabilities for reducing the possible locations of the disoriented receiver thereby refining the initial estimate of possible locations of the disoriented receiver. Accordingly, S320 may function to select additional radio frequencies for performing test cycles that satisfy or exceed a minimum probability threshold for locating the disoriented receiver.2215

In one implementation, S320 implements in a machine learning model (e.g., a deep learning model) that functions to predict one or more frequencies for performing the additional search and test cycles. Specifically, S320 may function to use, as machine learning input into a trained machine learning model, the superposition patterns of coherence signals collected by each of the sampling receiver and the disoriented receiver, the known locations of the at least two transmitters and the sampling receiver, the phase angle between the sub-carrier signals, and various test cycle parameters to predict the one or more frequencies for the additional searches performed within the additional test cycles.

During the additional test cycles (or the initial test cycle), while maintaining a phase lock of the interference signals, S320 may function to vary the frequency in the test cycle to vary positions of the peaks and valleys of the interference patterns captured by each of the sampling receiver and the disoriented receiver. By varying the frequency in this manner, S320 functions to explore the search space of potential locations of an object (e.g., the disoriented receiver) that is the subject matter of the search. Specifically, the interference patterns of the signal sampling data obtained by the sampling receiver and the interference patterns of the signal sampling data obtained by the disoriented receiver may be compared, as described below in S330, to determine an exact (or near exact) location of the disoriented receiver in the search space of potential locations within an accuracy level determined by the frequency range involved in the search. For instance, S320 preferably varies the frequency used in the test cycle to be between 902 MHz and 928 MHz. For instance, at 915 MHz of the ISM band, the accuracy level of the pinned down location of the disoriented receiver is approximately 32.76 cm, which may be calculated by dividing the speed of light (i.e., 299,792,458 m/s) by the selected frequency (915,000,000 cycles/s). S320 may function to vary the frequency used in the test cycles as often as necessary to generate sufficient comparison data at each of the sampling receiver and the disoriented receiver to cover the search space of the potential locations of the disoriented receiver.

S320 may additionally function to store (record) the collected signal samples on a temporary storage device (e.g., RAM) and/or a long-term or persistent storage device (e.g., non-volatile memory). Additionally, or alternatively, S320 may function to transmit the signal samples to another node, such as a centralized signal processing node.

2.1.2 Test Cycle (Phase-I)—$3^{rd}$ Dimension Discovery

The method 300, optionally, includes switching the mode of one or more of the location discovery devices S325. The location discovery devices preferably include any devices or components operating in the test cycle to discover a location of the disoriented receiver. During a first phase of the test cycle, the location discovery devices, which include the at least two transmitting devices and the sampling receiver may function to generate interference signals and collect samples of the resulting interference patterns for the purposes of determining at least two dimensions of location (e.g., X, Y-positions) of the disoriented receiver.

Once a signal sample of sufficient size relative to the bandwidth and sampling quality/rate have been obtained by the sampling receiver from the transmission signals of the at least two transmitting devices, S325 may function to automatically switch the mode of operation of the sampling receiver and at least one of the at least two transmitting devices. That is, S325 may function to automatically switch a mode of operation of the sampling receiver from a receiving mode to a transmitting mode, such that the sampling receiver begins to transmit signals and, in some embodiments, terminates receiving and/or signal collection functionalities. Similarly, S325 may function to switch a mode of operation of one of the at least two transmitting devices from a signal transmission mode to a signal receiving mode.

Accordingly, S325 functions to enable a mode switching to enable the location discovery devices to determine, at least, a third dimension of location (e.g., Z-position or altitude) of the disoriented device. Thus, in a second phase of the test cycle in which the modes of some of the location discovery devices have been switched, S325 may function to implement coherence and incoherence signal generation by at least two transmitting devices (a first transmitter and the converted transmitter that was formerly the receiver) and signal sample collection by at least one converted sampling receiving device (e.g., formerly a transmitting device).

S325 may function to implement the second phase of the test cycle for location discovery using same or similar test cycle parameters used during a first phase of the test cycle. In this way, the converted transmitting device may function to transmit signals in a time-synced and phase-locked manner with at least one other transmitting device using a same frequency setting. Additionally, the converted sampling receiver may function to coordinate or time synchronize the collection of signal samples with the disoriented device, such that the converted sampling receiver and the disoriented receiver function to collect signal samples of a same size and preferably, within a same period.

Additionally, or alternatively, S325 may function to automatically trigger the mode switching of the modes of the location discovery devices based on a predetermined period of time defined within the test cycle parameters. That is, the expiry of the predetermined period of time may act as a mode switching trigger that causes specific ones of the location discovery devices to alter their modes of operation for a second phase of the test cycle.

In one variant of S325, S325 may function to automatically trigger the mode switching based on an indication from the sampling receiver of the first phase of the testing cycle providing an indication that a sufficient sampling size has been collected or achieved. The indication from the sampling receiver, in such instance, may cause the automatic conversion of specific ones of the location discovery devices for a second phase of the test cycle.

2.2 Enhanced Signal Processing—Location Reduction

S330, which includes analyzing the collected signal samples, functions to apply one or more signal processing techniques to the collected signal samples. To begin, S330 may function to aggregate the signal sample data from both the sampling receiver and the disoriented receiver. In some embodiments, aggregating the signal sample data preferably includes the sampling receiver transmitting to the disoriented receiver signal sample data collected during the test cycle by the sampling receiver; reversely, the disoriented receiver may transmit signal sample data collected by the disoriented receiver during the test cycle to the sampling receiver. Additionally, or alternatively, both the sampling receiver and the disoriented receiver may transmit signal sample data collected during the test cycle to another node, such as a centralized signal processing node.

S330 may separately analyze signal sample data from the sampling receiver and the disoriented receiver, respectively, to determine one or more characteristics and/or attributes of the signal sample data. For instance, S330 may function to identify coherent and incoherent segments of the signal sample data. Using the coherence data from the signal sample data from each of the sampling receiver and the disoriented receiver, S330 may then function to determine or measure a phase of the signal sample data collected by the sampling receiver and a phase (e.g., signal strength) of the signal sample data collected by the disoriented receiver. The phase data for the signal sample data may include whether the analyzed wave forms of the signal sample data were in a peak or in a well. In a preferred embodiment, S330 compares the superposition patterns of the identified coherent segments of the signal sample data of each of the sampling receiver and the disoriented receiver. In such preferred embodiment, using time synchronization data (e.g., start/stop times of transmission) of the transmission signals, S330 functions to correlate, in time, the superposition patterns obtained from the sampling receiver and the superposition patterns obtained from the disoriented receiver.

In the case that S330 functions to identify superposition patterns of the signal sampling data for each of the sampling receiver and the disoriented receiver, it may be possible to approximate a location of the disoriented receiver based on the known location of the sampling receiver and the at least two transmitting devices, the superposition patterns (e.g., peak or well characteristics) obtained from the signal sample data of the sampling receiver, and the superposition patterns obtained from the signal sample data of the disoriented receiver.

S330, using comparator circuitry, functions to implement comparisons, in time, of the superposition patterns obtained from the sampling receiver and the superposition patterns obtained from the disoriented receiver. Together with the known location data of the location discovery devices, S330 reduces the search space of a possible location of the disoriented receiver. Specifically, S330 functions to compare the signal sample data of the sample receiver and the disoriented receiver at specific points in time to reduce a search space of possible positions for the disoriented receiver based on a wavelength of the signal produced by the transmitters and expected coherence at different points from the transmitters. In one instance, S330 functions to compare the superposition patterns of the sampling receiver and the superposition patterns of the disoriented receiver identified in an initial test cycle to determine whether the superposition (e.g., peak or well) of their respective signal sample data are the same or not the same at a specific point in time. The resulting comparison at S330 may be used to estimate an initial reduction in the search space of possible locations of the disoriented receiver with respect to the at least two transmitters, as the known location of the sampling receiver and the comparison of the phase data from the sampling receiver and the disoriented receiver may be used to confine the possible locations of the disoriented receiver. The initial possible locations of the disoriented receiver may include those locations at which superposition patterns of the sampling receiver and the superposition patterns of the disoriented receiver appear to match.

Additionally, because the locations of the sampling receiver and the at least two transmitting devices are known, it is possible to define a position (e.g., X, Y, Z positions) of the sampling receiver with respect to each of the at least two transmitting devices. For instance, it may be determined that the sampling receiver is 330 centimeters and 600 centimeters from a first and a second transmitting device, respectively, of the at least two transmitting devices. The relative position data of the sampling receiver together with the comparison data generated at S330 function to limit an initial array of possible relative positions of the disoriented receiver from the at least two transmitting devices.

The test cycle data collected from the additional test cycles in which the transmission frequencies were varied may be used to identify additional apparent matches between the superposition patterns of a prior test cycle to superposition patterns of a test cycle of the additional test cycles. Identifying apparent matches among superposition patterns across test cycles further limits or reduces the initial array of possible relative positions of the disoriented receiver from the at least two transmitting devices. Accordingly, with each subsequent test cycle (assuming refining frequencies were used), S330 may function to map the locations of the apparent matches towards a highly probable location of the disoriented receiver in the search space.

It shall be understood that S330 may function to perform similar analysis including comparisons between the superposition patterns of signal sample data obtained by the converted sampling receiver during phase II of the test cycle and additional superposition patterns of signal sample data obtained during phase II of the test cycle. This analysis of phase II data of the test cycle may be used assistively in S340 to further reduce possible positions of the disoriented receiver, as a third dimension of location of the disoriented receiver may be discovered during phase II and may be used to determine an exact location of the disoriented receiver within the search space.

Optionally, S335, which includes measuring characteristics and attributes of sub-carrier signals, may function to further reduce the initial search space of possible locations of the disoriented receiver performed in S330 by identifying and/or measuring characteristics and attributes of the sub-carrier signal of the interference signals of the at least two transmitters. The sub-carrier signal may be formed as a result of slight drift in a frequency of transmission of one or both of the two transmitters. Ideally, the two transmitters are preferably set or configured to transmit phase-locked signals at the same frequency. However, due to external events or discrepancies in the design of the transmitters, such as the heating up of transmitter components or deterioration of transmitter components it becomes possible for the set frequencies of the transmitters to drift apart thereby causing the deliberately generated interference signal (e.g., the primary carrier) having coherence and incoherence components to also have an unintentionally generated sub-carrier signal.

Preferably, S335 functions to measure the sub-carrier signals of the interference signals obtained at the sampling receiver and obtained at the disoriented receiver for each test cycle. S335 preferably analyzes the measured sub-carrier signals, in time, to determine a phase angle, between the coherence segments of the measured sub-carrier signals obtained from the sampling receiver and the disoriented receiver, respectively. The calculated phase angle between the measured sub-carrier signals may be used to determine a physical distance between the sampling receiver and the disoriented receiver and therefore, the phase angle can be used as an additional data point to reduce the possible positions of the disoriented receiver within the search space. S335 may function to calculate phase angle data for each test cycle.

S350, which includes determining a location of the disoriented receiver, functions to reduce the possible locations of the disoriented receiver to a single most probable position within the search space.

In one implementation, S350 may function to use the iterative signal analysis data generated according to S330-S340 to progressively narrow the possible locations of the disoriented receiver by identifying a mapping based on the apparent matches between the superposition patterns of the sampling receiver and the disoriented receiver from each test cycle. In such implementation, S350 may use the mapping to identify clusters having a high density (e.g., a density that meets or exceeds a density threshold) of apparent matches of superposition patterns. S350, using the known locations of the location discovery devices together with the generated phase angle data, may function to estimate with reasonable accuracy a single location of the disoriented receiver within an accuracy level of the frequencies used in the searches. For instance, a physical distance between the sampling receiver and the disoriented receiver that is calculated based on the measured phase angle may function as a radius distance from the sampling receiver. In such instance, a circular-shaped bound may be formed with the sampling receiver at an origin of the circle and the peripheral bounds of the circle being defined by the radius distance. Accordingly, a location of the disoriented receiver, in some embodiments, may be approximated based on clusters of probable locations of the disoriented receiver having a high density at one or more points near or on the peripheral bounds of the circle.

Additionally, or alternatively, in another implementation, S350 may function interpolate or extrapolate a possible distance away from each of the at least two transmitting devices that the disoriented receiver may be, where the interpolation is performed in an area defined by the difference of the superposition patterns of the sampling receiver and the superposition patterns of the disoriented receiver. That is, using the known position of the sampling receiver as a starting point, S340 may interpolate one or more possible distances of the disoriented receiver from the transmitting devices using the known position of the sampling receiver relative to the transmitters as a starting point and using the distance or area between the superposition patterns of the signal sample data at the sampling receiver and the superposition patterns of the signal sample data at the disoriented receiver.

It shall be noted that S350 may use any combination of the foregoing implementations to determine a location of the disoriented receiver.

The system and methods of the preferred embodiment and variations thereof can be embodied and/or implemented at least in part as a machine configured to receive a computer-readable medium storing computer-readable instructions.

The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application-specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method of radio-based location of a device having an unknown geographic location, the method comprising:
   simultaneously implementing:
      (i) at least two radio signal sources having two distinct known geographic locations;
      (ii) at least one radio signal receiving device having a known location that is geographically remote from the at least two radio signal source;
   establishing a communication network between the at least two radio signal sources, the at least one radio signal receiving device having the known location, and at least one radio signal receiving devices having an unknown fixed geographic location that is geographical distinct from the at least two radio signal sources and the at least one radio signal receiving device having the known geographic location;
   initiating, by each of the at least two radio signal sources, a coordinated transmission of radio signals that are phase-locked with each other using a same radio frequency band during a first period;
   collecting, by the at least one radio signal receiving device having the known geographic location and by the one radio signal receiving device having the unknown geographic location, one or more samples of the radio signals transmitted by the at least two radio signal sources during the first period;
   analyzing first radio signal dataset that includes the one or more samples of the radio signals collected by the at least one radio signal receiving devices having the known location and a second radio signal dataset that includes the one or more samples of the radio signals collected by the at least one radio signal receiving device having the unknown fixed geographic location, wherein the analyzing includes:
      identifying coherence points and incoherence points between the one or more samples of the radio signals collected by the at least one radio signal receiving device having the known geographic location and the one or more samples of radio signals collected by the at least one radio signal receiving device having the fixed unknown geographic location; and
      identifying one or more possible locations of the at least one radio signal receiving device having the unknown fixed unknown location based on the identified coherence points and incoherence points within the one or more samples of the radio signals of the at least one radio signal receiving device having the known geographic location and the at least one radio signal receiving device having the unknown geographic location.

2. The method according to claim 1, further comprising:
setting radio signal transmission parameters for each of the at least two radio signal sources, wherein setting the radio signal transmission parameters includes:
   setting a same radio signal transmission start time for each of the at least two radio signal sources;
   setting a same radio signal transmission end time for each of the at least two radio signal sources; and
   setting the same radio frequency band for the radio signal transmission for each of the at least two radio signal sources.

3. The method according to claim 1, further comprising:
setting radio signal transmission parameters for each of the at least two radio signal sources, wherein setting the radio signal transmission parameters includes:
   setting each of the at least two radio signal sources to transmit the radio signals in a phase-locked manner.

4. The method according to claim 1, further comprising:
setting radio signal sampling parameters for the at least one radio signal receiving device having the known location and for the at least one radio signal receiving device having the unknown location, wherein setting the radio signal sampling parameters includes:
   setting a same radio signal sampling start time for the at least one radio signal receiving device having the known location and for the at least one radio signal receiving device having the unknown location; and
   setting a same radio signal sampling end time for each of the at least one radio signal receiving device having the known location and for the at least one radio signal receiving device having the unknown location.

5. The method according to claim 1, further comprising:
providing an initialization signal to each of:
   the at least two radio signal sources,
   the at least one radio signal receiving device having the known location, and
   the at least one radio signal receiving device having the unknown location, wherein the initialization signal coordinates the coordinated radio signal transmission and the coordinated collection of the one or more samples of the radio signals.

6. The method according to claim 1, further comprising:
reducing the possible locations of the at least one radio signal receiving device having the unknown location, wherein the reducing includes:
   setting the at least two radio signal sources to a second radio frequency band;
   transmitting, by each of the at least two radio signal sources, radio signals using the second radio frequency band during a second period;
   collecting, by the at least one radio signal receiving device having the known location and by the at least one radio signal receiving device having the unknown location, samples of the radio signals using the second radio frequency band during the second period.

7. The method according to claim 6, further comprising:
implementing a trained machine learning model that predicts the second radio frequency band used in reducing the possible locations of the at least one radio signal receiver having the unknown location, wherein the implementing includes:

providing machine learning input into the trained machine learning model, machine learning input comprising two or more of:
    superposition patterns of coherence signals identified from the one or more samples of the radio signals collected by the at least one radio signal receiving devices having the known location and by the at least one radio signal receiving device having the unknown location during the first period,
    the known locations of the two or more signal sources and the sampling receiver, and
    a phase angle between sub-carrier signals; and
identifying, by the trained machine learning model, the second radio frequency band based on the machine learning input.

8. The method according to claim 6, wherein reducing the possible locations of the at least one radio signal receiving device having the unknown location further includes:
    measuring a sub-carrier radio signal of an interference signal produced by the radio signals transmitted by the at least two radio signal sources;
    identifying a phase angle between coherence segments of the measured sub-carrier radio signal; and
    identifying a distance between the at least one radio signal receiving device having the known location and the at least one radio signal receiving device having the unknown location.

9. The method according to claim 1, further comprising: varying positions of one or more peaks and troughs of a coherence signal generated by the at least two radio signal sources by selectively varying the radio frequency band used by the at least two radio signal sources during the first period or during a second period.

10. The method according to claim 1, further comprising:
switching an operating mode of one or more the at least two radio signal sources from a radio signal transmission mode to a radio signal receiving mode; and
switching an operating mode of the at least one radio signal receiving device having the known location from a radio signal receiving mode to a radio signal transmission mode.

11. The method according to claim 10, further comprising:
    causing the at least one radio signal receiving device in the radio signal transmission mode and one of the at least two radio signal sources to transmit coordinated radio signals during a second period; and
    causing the one or more of the at least two radio signal sources in the radio signal receiving mode to collect one or more samples of the radio signals during the second period.

12. The method according to claim 10, wherein switching the operating mode of one or more the at least two radio signal sources and the operating mode of the at least one radio signal receiving device having the known location is based on an expiry the first period or based on an indication that a sufficient sampling size of the radio signals has been collected.

13. The method according to claim 1, wherein the analyzing further includes:
    measuring a phase of the one or more samples of radio signal data collected by the at least one radio device having the known location;
    measuring a phase of the one or more samples of radio signal data collected by the at least one radio device having the unknown location;
    comparing, using time synchronization data, superposition patterns of identified coherent segments of the one or more samples of radio signal data collected by the at least one radio device having the known location and identified coherent segments of the one or more samples of radio signal data collected by the at least one radio device having the unknown location,
    wherein the identifying one or more possible locations of the at least one radio signal receiving device having the unknown location is further based on the comparison.

14. The method according to claim 1, further comprising:
generating a mapping of the identified one or more possible locations of the at least one radio signal receiving device having the unknown location;
identifying clusters of possible locations based on the mapping;
identifying a single approximate location of the at least one radio signal receiving device having the unknown location based on the clusters, the known locations of each of the at least two radio signal sources, and the known location of the radio signal receiving device having the known location.

15. The method according to claim 1, wherein each of the at least radio signal sources, the at least one radio signal receiving devices having the known location, and the at least one radio signal receiving device having the unknown location comprise an autonomous device that operates autonomously without a central governing authority.

* * * * *